March 5, 1940.   J. F. WALLACE   2,192,281
LANDING WHEEL MOUNTING FOR AIRCRAFT
Filed Dec. 7, 1938
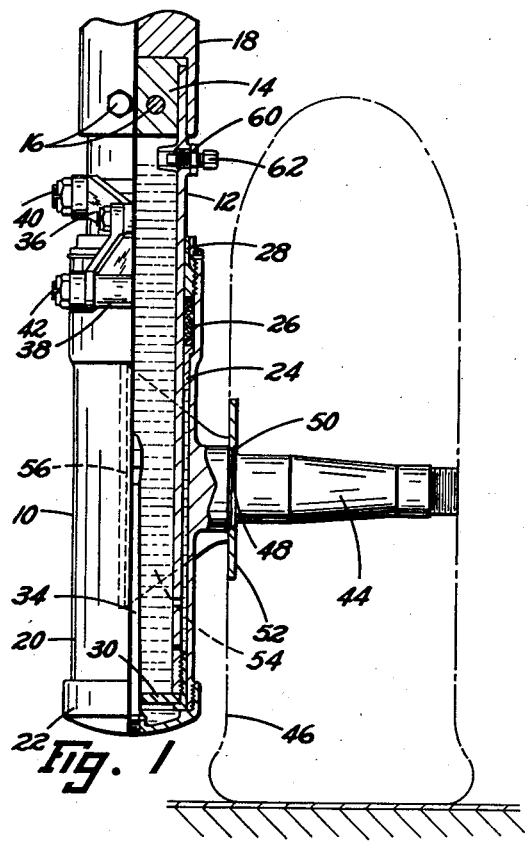
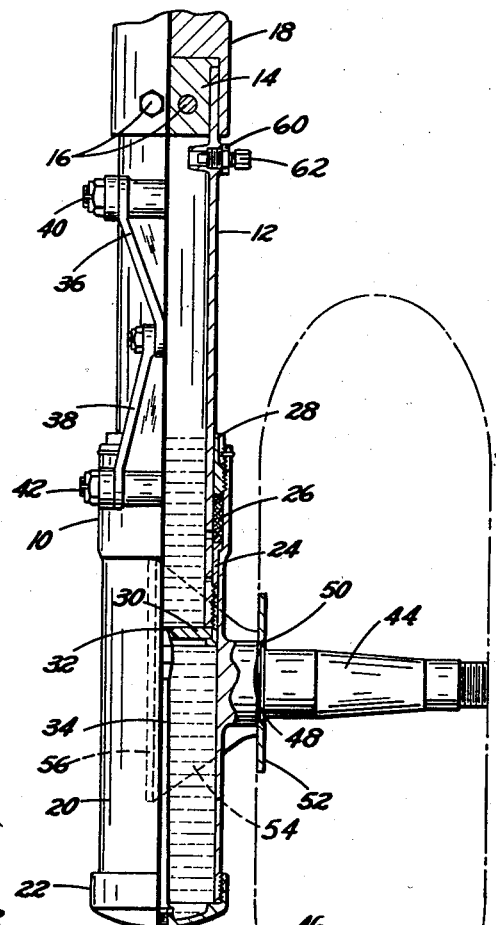
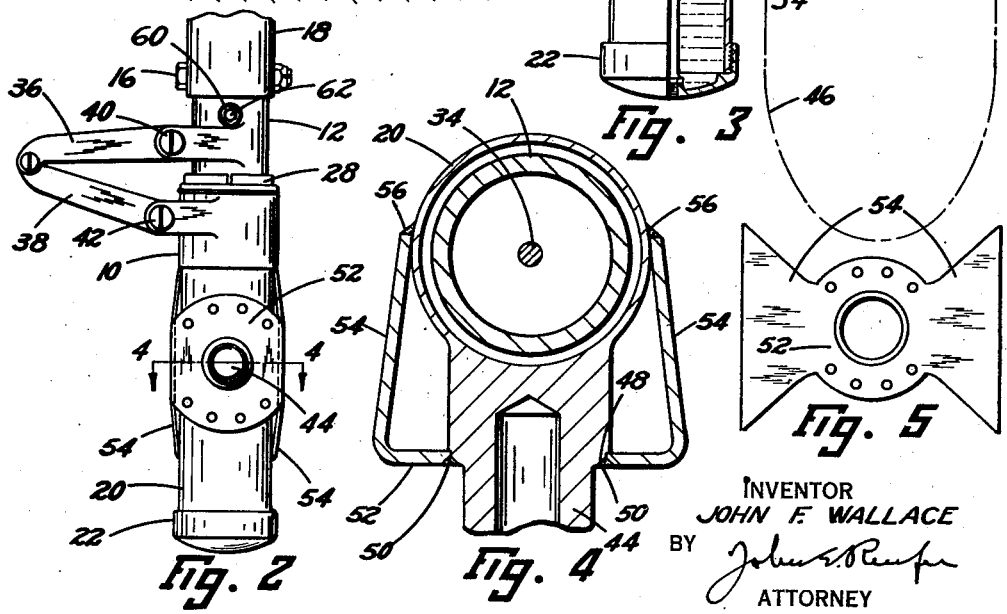
INVENTOR
JOHN F. WALLACE
BY
ATTORNEY Patented Mar. 5, 1940

2,192,281

UNITED STATES PATENT OFFICE 2,192,281

LANDING WHEEL MOUNTING FOR AIRCRAFT

John F. Wallace, Shaker Heights, Ohio, assignor to The Cleveland Pneumatic Tool Company, Cleveland, Ohio, a corporation of Ohio Application December 7, 1938, Serial No. 244,327

9 Claims. (Cl. 244—104)

This invention relates broadly to aircraft, but more particularly to an improved landing wheel mounting for aircraft.

One object of this invention is to produce an improved landing wheel mounting for aircraft including a shock absorbing strut forming a compact and efficient assembly.

Another object of this invention is to produce a landing wheel supporting shock absorber constructed in a manner assuring perfect alignment of the wheel in a fore to aft direction, and provided with means calculated to efficiently resist the lateral thrusts to which the axle of the wheel may be subjected.

Another object of this invention is to produce a landing wheel mounting for aircraft including an oleo shock absorber formed with an integral wheel axle affording a rigid and strong construction.

Another object of this invention is to construct a landing wheel support including shock absorbing means partly located below the center axis of the wheel, thereby resulting in a relatively short and compact assembly best suitable for use in landing gear of the retractable type.

Other objects and advantages more or less ancillary to the foregoing reside in the specific construction and aggroupment of the elements peculiar to this structure, as will become apparent from a more complete examination of this specification.

In the drawing:

Fig. 1 is a front elevational view, partly in section, of the landing wheel supporting strut shown in the fully compressed position.

Fig. 2 is a view similar to Fig. 1 showing the strut in the fully extended position.

Fig. 3 is a side elevational view of the assembly shown in Fig. 1.

Fig. 4 is an enlarged cross sectional view taken in a plane indicated by line 4—4 in Fig. 3.

Fig. 5 is a reduced plan view of a stamping used in the construction of the landing wheel mounting.

Referring to the drawing, the landing wheel supporting strut generally designated by 10, includes an inner cylinder 12 closed at its outer end by a plug 14 and having secured thereon, by bolts 16, a bracket 18 through which the outer end of the inner cylinder is operatively connected to the airplane.

The inner cylinder 12 is slidable within an outer cylinder 20 closed at its lower end by a cap 22 and having its upper end slightly enlarged to accommodate a sleeve 24, packings 26 and a gland nut 28. The lower end of the inner cylinder is threaded to receive a piston head 30 formed with a central orifice 32 through which is free to slide a metering pin 34 extending upwardly from the cap 22.

Preventing relative rotation between the cylinders, there are provided pivotally interconnected torque arms 36 and 38, the torque arm 36 being pivotally connected to the upper end portion of the inner cylinder 12 as at 40, while the torque arm 38 is similarly connected to the upper end of the outer cylinder 20 as at 42.

Extending laterally from the outer cylinder 20 at substantially right angles with the center axis thereof, there is a wheel carrying axle 44, which axle is preferably formed as an integral part of the cylinder 20. As shown, the axle is located at substantially equal distance from the ends of the cylinder 20, but low enough relative to the lower end of the cylinder 20 to enable contact of the wheel 46 carried by the axle with the ground without any danger of the cap 22 engaging the ground even upon a complete deflection of the tire carried by the wheel. Near the cylinder, the inner end portion of the axle 44 is formed with an annular shoulder 48 having secured thereon by means of a weld 50, a radially extending flange 52 on which may be secured the drum of a brake mechanism generally included within the wheel 46. In practice, the flange 52 is preferably made of a stamping initially shaped substantially as shown in Fig. 5, and thereafter bent as shown in Fig. 4 to provide the flange 52 with two reinforcing side plates 54 which lead from the flange to opposite side walls of the outer cylinder 20 where they are welded as at 56. As shown, the outer ends of the plates 54, that is the ends of the plates resting on the cylinder, are wider than the inner ends thereof, thereby affording a better support for the axle 44, and enabling distribution of the lateral thrusts to which the axle may be subjected on relatively long portions of the cylinder 20.

Near its upper end, the inner cylinder 12 is provided with an apertured boss 58 accommodating a filler plug 60 and air valve 62 through which oil and compressed air may be admitted into the strut to cause its partial inflation preparatory to its operation. Since the operation of the shock absorbing strut is well known by those skilled in the art, no further description is thought necessary other than pointing out that during telescopic movement, the cylinders 12 and 20 are maintained in coaxial alignment by the sleeve 24 and gland nut 25 acting as upper sliding bearings between the two cylinders, and the piston head 30 acting as a lower sliding bearing.

When landing or taxiing, the wheel 46 carried by the axle 44 will transmit lateral thrusts on the axle 44 tending to cause rotation of the cylinder 20 relative to the cylinder 12, which rotation is prevented by any suitable mechanism similar to the torque arms 36 and 38. By providing the brake carrying flange 52 with reinforcing plates 54, the lateral thrusts of the axle 44 is transmitted on the wall of the cylinder 20, thereby reinforcing the joint between the cylinder and the axle. In order to prevent binding of the two cylinders resulting from the torque transmitted to the cylinder 20 by the axle 44, it is preferred to locate the axle 44 and the reinforcing plates 54 on the cylinder 20 in such a way causing the immediate portion of the cylinder 20 adjacent the axle 44 and plates 54 to be supported, during normal operation, by the sliding bearings 24 and 30. As shown in Fig. 3 when the shock absorber is in fully extended position, that is, when the airplane has left the ground, the axle 44 is near the bearing 30, while the relation of the bearing 30 with the plates 54 is such that the upper portion of the contacting areas of the plates with the cylinder is still supported by the bearing. On the other end, when the shock absorber is fully compressed, as shown in Fig. 1, the axle 44 and the major portion of the contacting area of the plates 54 with the cylinder 20 is located between the two bearings 24 and 30. Under normal conditions of operation, that is when landing or taxiing, the bearing 30 will be located substantially half way between the ends of its possible stroke within the cylinder 20, thereby causing the axle 44 and substantially the entire contacting area of the plates 54 with the cylinder 20 to be located between the two bearings.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a landing wheel mounting for aircraft, a shock absorber including a pair of telescoping cylinders, a wheel axle on the outer cylinder extending laterally therefrom, a rigid connection between said axle and its supporting cylinder, and reinforcing means for said connection including side plates fixed to opposite sides of said cylinder and to the inner end portion of said axle.

2. In a landing wheel mounting for aircraft, an elongated strut depending from the craft, a wheel axis rigidly connected to the strut extending laterally therefrom, and reinforcing plates fixed to opposite sides of the strut and to said axle at a place intermediate the ends thereof.

3. In a landing wheel mounting for aircraft, a shock absorber including a pair of telescoping cylinders, connecting means between the outer end of the inner cylinder and the craft, a wheel axle integral with the outer cylinder extending laterally therefrom, and reinforcing side plates leading from opposite sides of the outer cylinder to the inner portion of said axle, the end of each plate adjacent said outer cylinder being wider than the other end.

4. In a landing wheel mounting for aircraft, a shock absorbing strut including a pair of telescoping cylinders, a wheel axle fixed on one cylinder in angular relation therewith, and reinforcing side plates fixed to opposite sides of said axle and to said cylinder, said plates forming adjacent the inner end of said axle a flat radially extending flange accessibly spaced from said cylinder.

5. An aircraft landing wheel support comprising a shock absorbing strut, a wheel axle extending laterally from said strut, a rigid connection between said axle and strut, a lateral projection fixed on said axle and accessibly spaced from said strut, and bracing side plates for said projection fixed to said strut.

6. In a landing wheel mounting for aircraft, a shock absorber including a pair of telescoping cylinders, connecting means between the inner cylinder and the craft, means between said cylinders preventing relative rotation therebetween, axially spaced sliding bearings between said cylinders, a wheel axle integral with the outer cylinder extending laterally therefrom, and rigid braces between the outer cylinder and the inner end portion of said axle located on the outer cylinder to extend axially at least partway between said bearings irrespective of the telescoping movement of said cylinders.

7. In a landing wheel mounting for aircraft, a shock absorber including a pair of telescoping cylinders, connecting means between the inner cylinder and the craft, means between said cylinders preventing relative rotation therebetween, upper and lower sliding bearings between said cylinders, a wheel axle on the outer cylinder extending laterally therefrom and subjected to lateral thrusts tending to cause relative rotation between said cylinders, and rigid braces between said outer cylinder and the inner end portion of said axle arranged and disposed in a manner effecting partial transfer of the lateral thrusts from said axle to the wall of said outer cylinder at places located longitudinally at least part way between said bearings irrespective of the telescoping movement of said cylinders.

8. In a landing wheel mounting for aircraft, a shock absorbing strut including a pair of telescoping cylinders, a wheel axle extending laterally from said strut, a rigid connection between one of the cylinders and said axle, and a brake supporting bracket including a flat lateral projection fixed on said axle near the inner end thereof and formed with bracing side walls leading from the marginal edge of the projection to said cylinder.

9. In a landing wheel mounting for aircraft, a shock absorbing strut including a pair of telescoping cylinders, connecting means between the inner cylinder and the craft, a wheel axle integral with the outer cylinder extending laterally therefrom and subjected to lateral thrusts tending to cause relative rotation between said cylinders, means between said cylinders preventing said relative rotation, and rigid braces between said outer cylinder and the inner end portion of said axle shaped and disposed in a manner effecting partial transfer of the lateral thrusts from said axle to the wall of said outer cylinder within a longitudinal extent greater than the longitudinal extent of said axle immediately adjacent said outer cylinder.

JOHN F. WALLACE.